United States Patent [19]

Gagnon et al.

[11] Patent Number: 4,687,963
[45] Date of Patent: Aug. 18, 1987

[54] TUNGSTEN-HALOGEN ELECTRIC LAMP WITH PERMEABLE MEANS CLOSING AN OUTER ENVELOPE

[75] Inventors: Peter R. Gagnon, Georgetown; Robert M. Griffin, Hamilton; Stephen F. Kimball, No. Andover, all of Mass.

[73] Assignee: GTE Products Corporation, Danvers, Mass.

[21] Appl. No.: 862,161

[22] Filed: May 12, 1986

Related U.S. Application Data

[63] Continuation of Ser. No. 469,844, Feb. 25, 1983, abandoned.

[51] Int. Cl.4 .......................... H01J 5/54; H01K 1/46
[52] U.S. Cl. ...,................................. 313/17; 313/579; 313/318
[58] Field of Search .............................. 313/578, –580, 313/17, 318; 339/118 R; 362/206 L, 267

[56] References Cited

U.S. PATENT DOCUMENTS

| | | | |
|---|---|---|---|
| 2,406,271 | 8/1946 | Van Horn | 313/318 |
| 3,175,117 | 3/1965 | Kardos | 313/116 |
| 3,188,227 | 6/1965 | Vodicka et al. | 313/116 X |
| 3,243,634 | 3/1966 | Mosby | 313/285 |
| 3,355,612 | 11/1967 | Peek, Jr. | 313/318 X |
| 3,591,793 | 7/1971 | McKim | 339/176 L |
| 3,959,684 | 5/1976 | Anderson et al. | 313/318 |
| 4,074,165 | 2/1978 | Moriyama | 313/112 |

FOREIGN PATENT DOCUMENTS

| | | |
|---|---|---|
| 549226 | 11/1942 | United Kingdom . |
| 767971 | 2/1957 | United Kingdom . |
| 796454 | 6/1958 | United Kingdom . |
| 2062958 | 5/1981 | United Kingdom . |
| 2099217 | 12/1982 | United Kingdom . |
| 2100505 | 12/1982 | United Kingdom . |

Primary Examiner—Palmer C. DeMeo
Assistant Examiner—Sandra L. O'Shea
Attorney, Agent, or Firm—Joseph S. Romanow; William H. McNeill

[57] ABSTRACT

A tungsten-halogen electric lamp having permeable means closing an outer envelope. Such non-hermetic means may be relatively free-breathing or weather-tight. Tungsten-halogen lamps with permeable means may be manufactured more simply and economically than those currently available.

5 Claims, 2 Drawing Figures

TUNGSTEN-HALOGEN ELECTRIC LAMP WITH PERMEABLE MEANS CLOSING AN OUTER ENVELOPE

CROSS REFERENCES TO RELATED APPLICATIONS

This is a continuation of co-pending application Ser. No. 469,844 filed on Feb. 25, 1983 now abandoned.

TECHNICAL FIELD

This invention relates to tungsten-halogen electric lamps and more particularly to such lamps having permeable means closing an outer envelope.

BACKGROUND ART

Tungsten-halogen incandescent lamps are well known. A major advantage of tungsten-halogen lamps is improved lumen maintenance made possible by the halogen cycle which captures evaporated tungsten and returns it to the filament thereby virtually eliminating blackening of the bulb walls. The halogen cycle is sustained by surrounding a tungsten filament with a special atmosphere at appropriate pressure containing one or more halogens within a hermetically sealed envelope or capsule. Because of the virtual absence of wall blackening, the halogen capsule may be quite small. An outer envelope enclosing the halogen capsule provides the inner capsule with structural integrity, thermal and electrical isolation, and other important benefits which contribute to the feasibility of the lamp as a commercial and consumer product.

Under the existing art, the manufacture of a tungsten-halogen lamp typically involves the following steps. A halogen capsule having two lead-in wires is mounted on a glass stem support. The capsule and stem are inserted into the outer envelope. The glass stem support is flame sealed to the glass outer envelope. The outer envelope is evacuated, a desired fill gas may be introduced into the outer envelope, and the outer envelope is hermetically sealed. A lamp base is mounted on and cemented to the neck of the outer envelope. One of the capsule lead-in wires is soldered to the insulated tip of the base. The second lead-in wire is soldered to the outer shell of the base.

The described manufacturing process is relatively costly. The fabrication of a hermetic seal between the lead-in wires and glass stem and between the stem and outer envelope requires considerable technological skill and quality control.

The lighting industry is searching for a replacement for the Edison-type incandescent lamp which is currently the most popular type of lamp sold in the consumer market in the United States. Tungsten-halogen lamps, because of their superior performance characteristics, are being carefully considered by various lamp manufacturers as a replacement for the standard incandescent lamp. However, the cost of manufacturing a tungsten-halogen lamp under the existing art is significantly higher than that of the standard lamp. Consequently, there would be only a weak incentive for the consumer to purchase a tungsten-halogen lamp instead of the standard lamp. A tungsten-halogen lamp which can be provided at substantially less cost would constitute an advancement in the art.

DISCLOSURE OF THE INVENTION

It is, therefore, an object of this invention to obviate the deficiencies in the prior art.

It is another object of this invention to provide a tungsten-halogen lamp having permeable means closing the outer envelope.

It is still another object of this invention to provide a tungsten-halogen lamp which can be manufactured simply and economically.

These objects are accomplished, in one aspect of the invention, by the provision of a tungsten-halogen lamp having permeable means closing the outer envelope. The lamp comprises an outer envelope having a light-transmissive body and a neck. The neck of the outer envelope is open to the ambient atmosphere. The body of the outer envelope has approximately uniform light-transmissiveness over all portions thereof. A hermetically sealed tungsten-halogen capsule is mounted within the outer envelope. The outer envelope is closed with permeable means.

Tungsten-halogen lamps with permeable means closing the outer envelope may be manufactured more simply and economically than is possible under the existing art.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Figure 1:
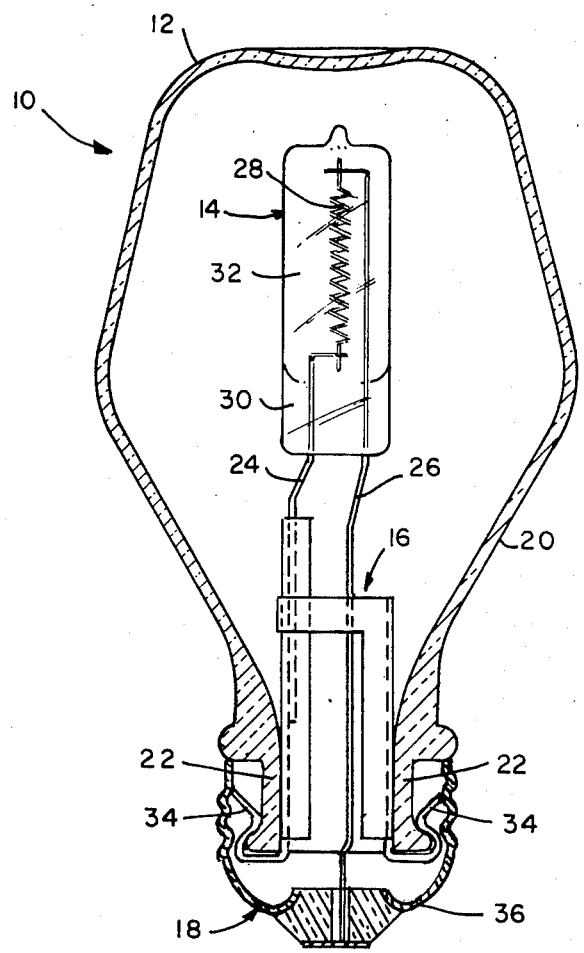
FIG. 1 is an elevational sectional view of one embodiment of the invention.

Referring to the drawings with greater partricularity, FIG. 1 shows one embodiment of the invention. Lamp 10 has outer envelope 12 comprising light-transmissive body 20 and neck 22. Body 20 has the property that its ability to permit light to pass through its walls is approximately uniform over all portions thereof. The exterior surface of outer envelope 12 is a continuous closed surface except for neck 22 which is open to the ambient atmosphere outside lamp 10.

Capsule 14, which is mounted within envelope 12, has a first lead-in wire 24 and a second lead-in wire 26. Tungsten filament 28 extends between the internal terminations of lead-in wires 24 and 26. Capsule 14 is hermetically sealed, in this instance by press seal 30. Capsule 14 contains a fill 32 including one or more halogens.

Capsule 14 may be mounted within outer envelope 12, for example, by welding lead-in 24 to metal frame-assembly 16. An exemplary way of mounting frame-assembly 16, with capsule 14 thereon, within outer envelope 12 employs clamps 34 which grasp the brim of neck 22 within formed grooves in neck 22. For a detailed explanation of this particular means of mounting frame 16 within outer envelope 12, see copending U.S. patent application, Ser. No. 469,841, filed concurrently herewith, the teaching of which are incorporated herein by reference.

Permeable means 18, in this instance comprising base 36, closes outer envelope 12. Base 36 may be mounted, e.g., by elastic and frictional forces as is taught in the aforementioned copending U.S. patent application, Ser. No. 469,841. The closing of outer envelope 12 with permeable means 18 may not be weather-tight, meaning that liquids and small particulate matter may enter within outer envelope 12. In such case, lamp 10 should be restricted to indoor use or use within a protective fixture. The tightness of the closing of outer envelope 12 may be improved by employing an adhesive bonding, a gasket, or the like between neck 22 and base 36. In this case, lamp 10 will be tightly closed and sufficiently weather-tight to be suitable for outdoor use. A weather-tight closing, although not a hermetic seal, is sufficiently tight to be impervious to wind, dust, rain, and other environmental contaminants. Thus, lamp 10 may be weather-tight without incurring the cost of fabricating a hermetic seal in the construction of the lamp.

Figure 2:
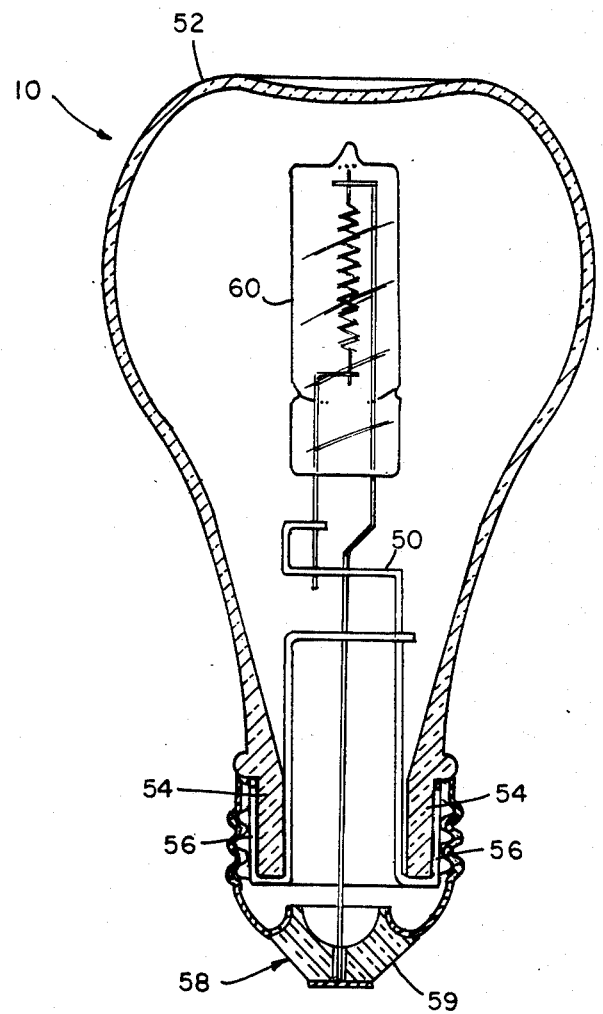
FIG. 2 is an elevational sectional view of another embodiment of the invention.

In FIG. 2, there is shown a second embodiment of the invention employing permeable closing means. Legs 56 of frame-assembly 50 may be formed to fit into receiving grooves in threaded neck 54. Closing means 58, in this instance comprising threaded base 59, may be achieved by screwing base 59 onto neck 54 such that formed legs 56 are securely held in the receiving grooves of neck 54. Thus, frame 50, with halogen capsule 60 mounted thereon, may be mounted within outer envelope 52. For a detailed description of frame-assembly 50 and an exemplary means for mounting same within outer envelope 52, see the aforementioned copending U.S. patent application, Ser. No. 469,841.

Outer envelope 12 or 52 may perform some or all of the following functions: provide electrical isolation to prevent shocks or short circuits; provide thermal isolation between the extremely hot inner halogen capsule and the user or flammable materials; insure containment in the event the inner capsule should burst; serve as a structural member for mounting the frame-assembly and/or base; protect the inner capsule from physical damage, contamination, and/or thermal shock; diffuse, scatter, and/or color the light output of the lamp with or without coatings; provide an aesthetic appearance or design; provide a convenient handle for installation or removal of the lamp; and, in some applications, provide means for support of a lamp shade.

The body of outer envelope 12 or 52 may have a light-diffusive or color-imparting coating on a surface thereof. The body may contain light-diffusive facets formed therein to reduce lamp glare. The term "light-diffusive facets" include molding, dimpling, stippling, etching, and any other process whereby the inside or outside surface of the body of the outer envelope is formed into a pattern, design, or matte which reduces lamp glare, or causes an aesthetic effect, or both.

As used herein, "permeable" is defined as that which is open to passage or penetration, especially by a fluid or gas. A permeable closing of the outer envelope is one where the interior of the outer envelope is not hermetically sealed.

In laboratory examples of the invention, the outer envelope was formed from soda-lime glass via a blow-molding manufacturing process. The frame assembly was fabricated from 0.020 inch (0.051 centimeter) thick nickel-plated stainless steel. The lamp base was a standard Edison base.

While there have been shown what are at present considered to be preferred embodiments of the invention, it will be apparent to those skilled in the art that various changes and modifications can be made herein without departing from the scope of the invention as defined by the appended claims.

We claim:

1. An integral double-enveloped electric lamp for general lighting applications comprising:
   (a) an outer envelope having a light-transmissive body and a neck open to the ambient atmosphere outside of said outer envelope, said body having approximately uniform light-transmissiveness over all portions thereof, said neck having mounting means formed therein;
   (b) an inner envelope being a hermetically sealed tungsten-halogen capsule;
   (c) a frame-assembly for mounting said tungsten-halogen capsule within said outer envelope, said frame-assembly being formed from a stiff electrically conductive material, said frame-assembly having first and second ends, said tungsten-halogen capsule being mounted on said first end, said second end being engaged with said mounting means of said neck;
   (d) a base mounted on said neck closing said outer envelope such that said closing is permeable to said ambient atmosphere, said base being engaged with said second end of said frame-assembly such that said frame-assembly is securely mounted on said mounting means of said neck;
   (e) an atmosphere within said outer envelope, said atmosphere being the same as said ambient atmosphere; and
   (f) means within said outer envelope for completing an operational electrical circuit between said tungsten-halogen capsule and said base, said electrical circuit including said frame-assembly as a portion thereof.

2. A lamp as described in claim 1 wherein said permeable closing of said outer envelope is impervious to particulate matter.

3. A lamp as described in claim 9 wherein said permeable closing of said outer envelope is impervious to liquids and particulate matter.

4. A lamp as described in claim 1 wherein said body of said outer envelope has a light-diffusing coating on a surface thereof.

5. A lamp as described in claim 11 wherein said body of said outer envelope has light-diffusive facets formed in a surface thereof.

* * * * *

UNITED STATES PATENT AND TRADEMARK OFFICE
CERTIFICATE OF CORRECTION

PATENT NO. : 4,687,963

DATED : AUGUST 18, 1987

INVENTOR(S) : PETER R. GAGNON; ROBERT M. GRIFFIN; STEPHEN F. KIMBALL

It is certified that error appears in the above—identified patent and that said Letters Patent is hereby corrected as shown below:

Column 4, line 49: Claim 3 should depend from Claim 1, not from Claim 9. Claim 3 should read:

3. A lamp as described in claim 1 wherein said permeable closing of said outer envelope is impervious to liquids and particulate matter.

Column 4, line 55: Claim 5 should depend from Claim 1, not from Claim 11. Claim 5 should read:

5. A lamp as described in claim 1 wherein said body of said outer envelope has light-diffusive facets formed in a surface thereof.

Signed and Sealed this

Eighth Day of March, 1988

Attest:

DONALD J. QUIGG

Attesting Officer      Commissioner of Patents and Trademarks